ELECTRONIC PHASE-DIFFERENCE COUNTER-CIRCUIT

Filed Dec. 15, 1967 Sheet 1 of 2

INVENTORS:
JAMES E. BELLINGER,
ROBERT F. MARSHALL,
BY Norman C. Fulmer
THEIR ATTORNEY.

INVENTORS:
JAMES E. BELLINGER,
ROBERT F. MARSHALL,
BY Norman C. Fulmer
THEIR ATTORNEY.

United States Patent Office 3,444,556
Patented May 13, 1969

3,444,556
ELECTRONIC PHASE-DIFFERENCE COUNTER-CIRCUIT

James E. Bellinger, North Syracuse, and Robert F. Marshall, East Syracuse, N.Y., assignors to General Electric Company, a corporation of New York
Filed Dec. 15, 1967, Ser. No. 690,839
Int. Cl. G01s *9/02;* H04b *1/16*
U.S. Cl. 343—7 8 Claims

ABSTRACT OF THE DISCLOSURE

A circuit is disclosed for counting recurrent phase shifts, using a phase-multiplying oscillator circuit that is phase-locked with the phase of an incoming signal such as a radar signal. The circuit includes means for comparing the phase of the locked oscillator (which varies in accordance with position (range) change of the incoming signal) with that of the transmitted carrier, and means for counting the cycles of phase shift so as to indicate distance or other information. To prevent counting error in the event of temporary losses of phase-lock of the oscillator with the incoming signal, a phase comparison circuit is connected to compare the phase of the incoming signal with that of the phase-locked oscillator circuit, and it generates output signals indicative of any loss of phase-lock. "Add" or "subtract" count pulses are generated in response to any such loss of phase-lock, and are fed to the counter in a manner to compensate for, and prevent erroneous counting due to, loss of the oscillator phase-lock.

*Background of the invention*

Systems for radar (by radio wave or other electromagnetic transmission), rocket tracking, etc. transmit a carrier wave and receive reflections or a retransmitted version of this wave from a rocket, missile, etc. The retransmitted wave may be modulated by telemetry information. Equipment for processing the received signal preferably comprises a phase-locked oscillator circuit having a phase locked multiplier loop for generating a signal at a multiple of the frequency and phase of the received signal. This improves accuracy and reduces undesirable effects of amplitude variations and noise. The received signal, and hence the locked oscillator, varies in phase with respect to the transmitted signal due to range change of the moving rocket or other device being tracked or measured. This phase variation, which may be in either forward or reverse direction depending on the relative direction of motion of the rocket or other device, is detected, and the cycles of phase shift (forward or reverse) are counted in a reversible counter circuit thus indicating range, velocity, and/or other desired information.

At times, due to a temporary high rate of phase shift, the locked oscillator will temporarily become unlocked and lose synchronization, thus temporarily causing erroneous phase counting in a manner depending on the random or free-running phase of the oscillator. This, of course, causes errors in the tracking, distance, velocity, and other data. Such errors may go unnoticed, but frequently they can be discovered due to the characteristics of the data deviating and then returning to values compatible with the values prior to the deviation. This identification of data errors requires the time and judgment of skilled personnel, and may be unfeasible in real-time missions.

*Summary of the invention*

Objects of the invention are to provide an improved electronic phase counter circuit and to solve the above-described problem of erroneous data due to temporary loss of locking of a phase-locked oscillator.

The improved phase counter circuit of the invention comprises, briefly and in a preferred embodiment, a circuit arrangement connected to the aforesaid phase-locked oscillator and counter-circuit and having a phase comparator means for comparing relative phase of the incoming signal with that of the phase-locked oscillator circuit, and for producing corrective count pulses in response to any deviation from a locked phase relationship between the locked oscillator and the incoming signal, and means for feeding these corrective count pulses to the counter in a manner to compensate for, and prevent erroneous counting due to, loss of the oscillator phase-lock. The invention further comprises a coincidence detector arrangement for preventing the aforesaid corrective count pulses from reaching the counter simultaneously with any of the erroneous count pulses. The invention also comprises circuitry for achieving the aforesaid error correction when counting in both forward and reverse directions.

*Description of the preferred embodiment*

Figures 1, 2:
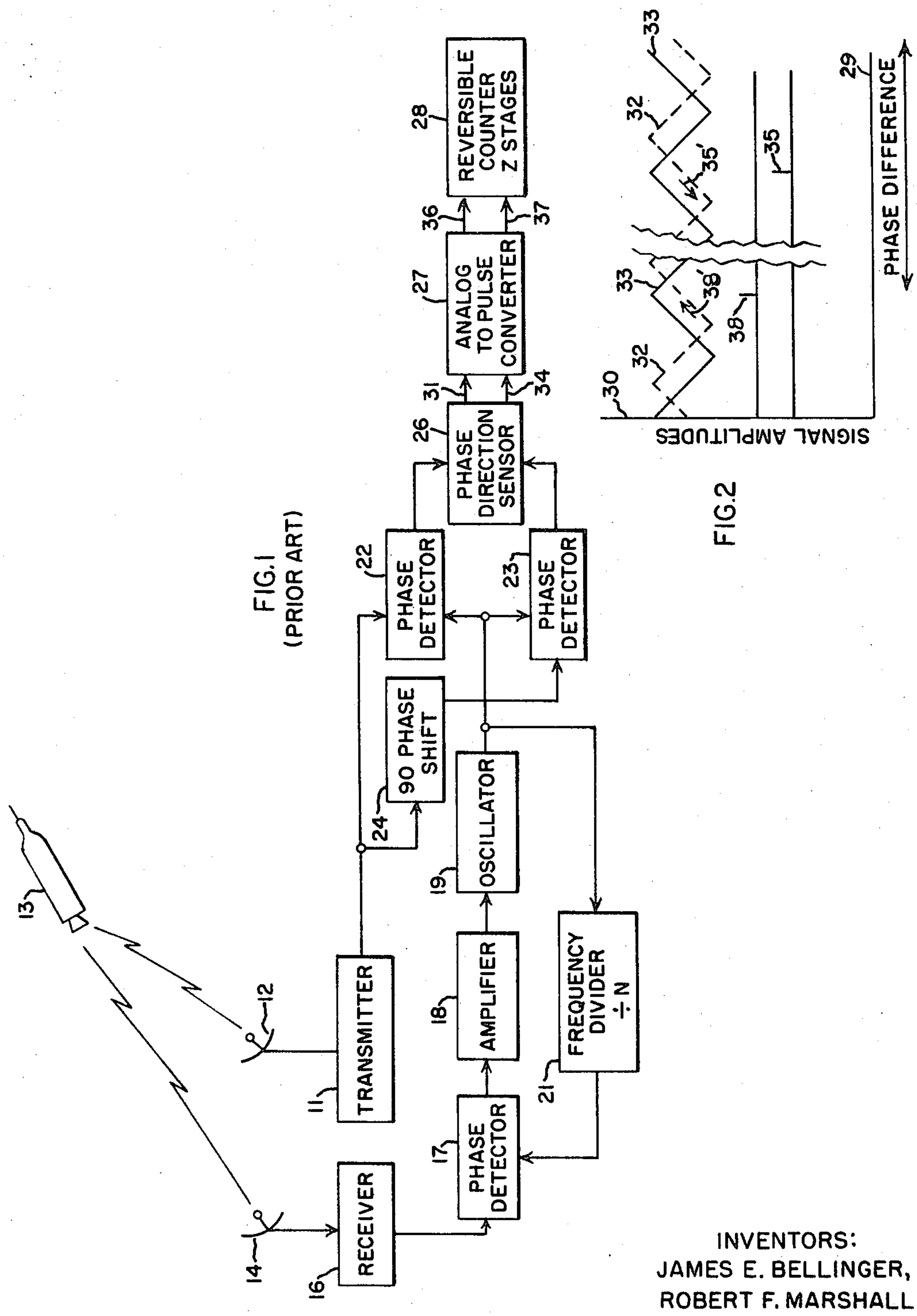
FIG. 1 (PRIOR ART), FIG. 2
FIGURE 1 is an electrical block diagram of a prior art electronic phase-difference circuit.
FIGURE 2 is a graphical representation of certain signals in the circuit of FIGURE 1.

In the prior art radar system shown in FIGURE 1, a transmitter 11 transmits signals by means of an antenna 12, for the purpose of tracking a rocket 13 or other moving device. Signals reflected from the rocket 13 are picked up by a receiver antenna 14 and fed to a receiver 16. Alternatively the rocket 13 may, by means of a transponder or beacon device, transmit to the receiving antenna 14 a signal in response to transmitted signals received at the rocket 13 from the transmitting antenna 12. The receiver 16 may contain superheterodyne and amplifier circuits.

The signal output of the receiver 16 is fed to a phase detector 17, the output of which is amplified by an amplifier 18 and applied to an oscillator 19 so as to control the oscillator frequency, in well-known manner. The oscillator output is fed through a frequency divider 21, which divides frequency by the integer N, to another input of the phase detector 17. In a preferred embodiment, N is thirty-two. Thus, the oscillator 19 oscillates at a frequency of N times that of the incoming signal. The phase detector 17, amplifier 18, oscillator 19, and frequency divider feedback 21, comprise the well-known phase-locked loop oscillator circuit, whereby the oscillator 19, which oscillates at a higher frequency than that of the incoming signal to the phase detector 17 from the receiver 16, is locked in phase to this incoming signal by means of the frequency divider 21 and phase detector 17.

The output of the phase-locked oscillator 19 is applied to inputs of a pair of phase detectors 22 and 23. The transmitter 11 includes a phase-locked frequency multiplier for producing a multiple N of the carrier frequency, and this multiple N of the carrier is applied to another input of the phase detector 22, and also is applied, through a 90° phase shift circuit 24, to another input of the phase detector 23. Outputs of the phase detectors 22 and 23 are applied to inputs of a phase direction sensor circuit 26, which derives output signals as shown in FIGURE 2, which signals are fed to an analog-to-pulse converter 27, the output signals of which are fed to a reversible counter 28 having Z stages.

The phase detectors 22 and 23 compare the phase of the N multiple of the transmitted carrier frequency of transmitter 11 with the phase of the output signal of the locked oscillator 19, and produce output signals indicative of any difference in phase between these two signals. For this purpose, the N multiple of the carrier frequency of the transmitter 11 may be considered as being a fixed frequency steady reference signal, and the output signal of locked oscillator 19, which is locked with respect to phase of the incoming signal applied to phase detector 17, will vary depending upon a change in position of the rocket 13. This phase shift will be in a forward or backward direction, depending upon a relative direction of motion of the rocket 13.

The phase direction sensor 26 functions to determine whether the change in phase is in the forward or backward direction, and produces at one of its outputs 31 a signal which follows a triangular shaped path 32 (FIGURE 2) in a forward or reverse direction responsive to forward or reverse change in phase of the incoming signal with respect to the transmitted carrier. In FIGURE 2, the horizontal axis 29 represents phase difference and the vertical axis 30 represents signal amplitudes. The signal at the other output 34 of the phase direction sensor 26 follows a triangular shaped path 33 which is 90 degrees out of phase with the triangular path 32, and which functions to alternately enable and disable the analog-to-pulse converter 27. That is, when the signal of triangular path 33 is positive polarity, the converter 27 is enabled, and when this signal is negative, the converter 27 is disabled. During the cyclic times that the converter 27 is enabled, it produces an "add" pulse 38 whenever the signal on the triangular path 32 crosses zero in a positive-going direction as indicated by the arrow 38', these "add" pulses being applied to the counter 28 via connection 36. If the signal on triangular path 32 crosses zero in a negative-going direction as indicated by the arrow 35' during an enable interval, a "subtract" pulse 35 is produced and applied to the counter 28 via connection 37. An "add" or "subtract" pulse is produced every time the signal on path 32 moves a cycle or far enough to cross the zero axis during an "enable" interval. Thus, the reversible counter 28 at any given moment is either not counting, or counting in an additive manner, or counting in a subtractive manner, whereby the total count therein at any moment is indicative of the number of cycles of phase change and hence the range (position) of a rocket 13. It should be noted that the triangular shaped paths 32 and 33 will be truncated in the event of clipping, limiting, or other non-linear effects in the circuits.

Figure 3:
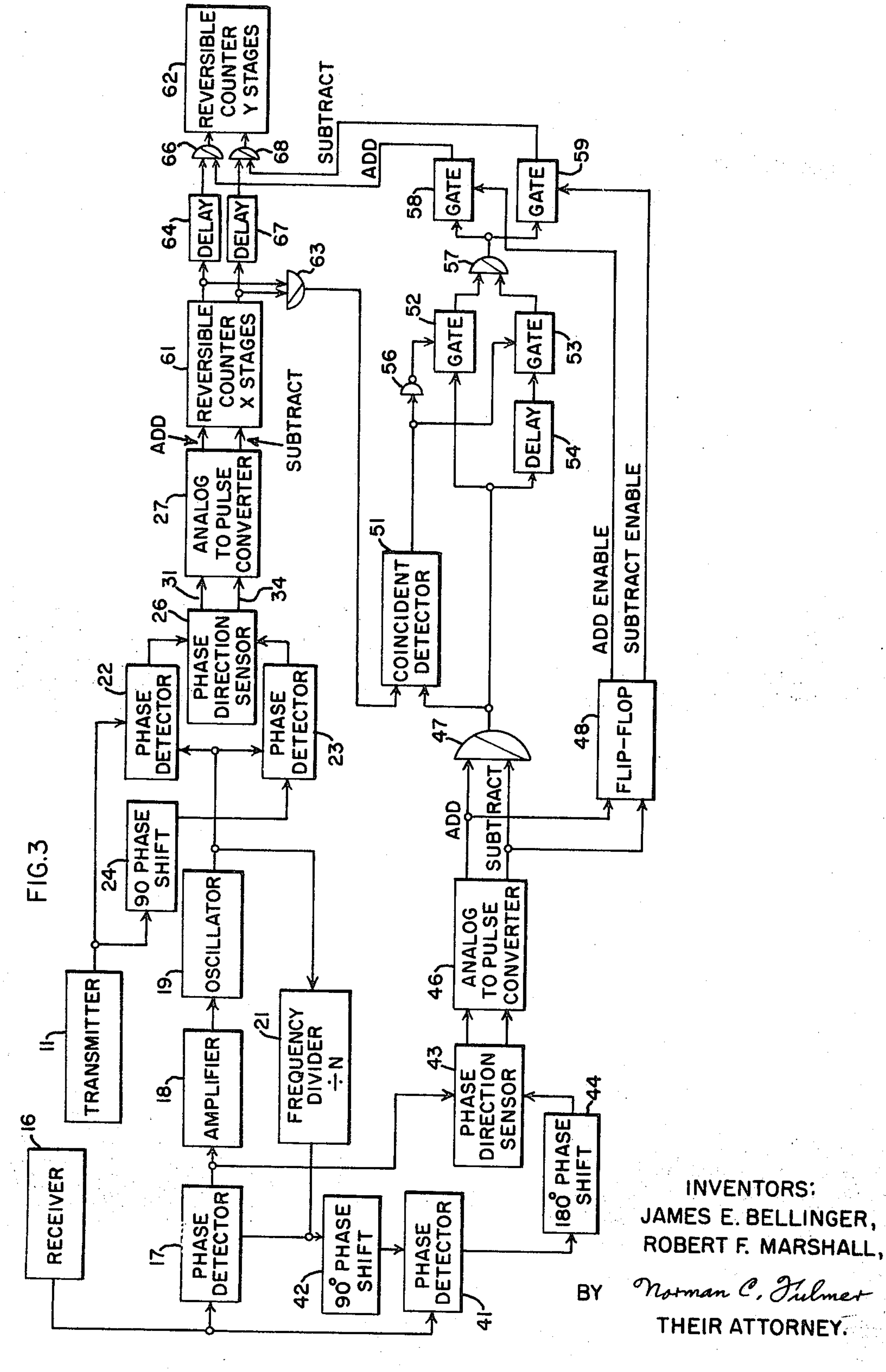
FIGURE 3 is an electrical block diagram of a preferred embodiment of the invention.

Now referring to FIGURE 3, which is a block diagram of a preferred embodiment of the invention and in which the prior art portions thereof are given the same reference numerals as in FIGURE 1, there is provided an additional phase detector 41 to which the output of receiver 16 is connected as an input thereto, the output of the frequency divider 21 being connected as another input thereto via a 90° phase shift network 42. The output of phase detector 41 is connected to a phase direction sensor 43 via a 180° phase shift network 44, and the output of the first-mentioned phase detector 17 is applied to the phase direction sensor 43 as another input thereto. The signal outputs of the phase direction sensor 43 are connected to an analog-to-pulse converter 46. In the circuitry just described, the phase detectors 17 and 41, phase shifter 42, phase direction sensor 43, and analog-to-pulse converter 46, are the same as and function similarly to the previously described circuits 22, 23, 26, and 27. The 180° phase shifter 44 is added to obtain a phase reversal of the enable-disable signal 33, in order to insure reliable operation in the presence of large amounts of noise accompanying the incoming signal.

The "add" and "subtract" output pulses of the analog-to-pulse converter 46 are both fed to inputs of an OR gate 47, and also to the inputs of a flip-flop circuit 48. The "add" or "subtract" pulses from the converter 46 may occur, if and when they do occur, singly, multiply, or alternatively but not simultaneously.

The output of the OR circuit 47 is applied to an input of a coincident detector circuit 51, and also to an input of a first gate circuit 52 and to the input of a second gate circuit 53 via a delay network 54. The output of the coincident detector 51 is applied directly to the gate 53, and is applied to the gate 52 via a polarity inverter 56. The outputs of the gates 52 and 53 are applied to inputs of an OR circuit 57, the output of which is fed to inputs of gate circuits 58 and 59, these gates being controlled respectively by an "add enable" output and a "subtract enable" output from the flip-flop circuit 48. The gate 58 produces "add" pulses and the gate 59 produces "subtract" pulses, which are applied to the reversible counter as will now be described.

The reversible counter in FIGURE 3, instead of comprising Z stages as the counter 28 in FIGURE 1, comprises a first counter section 61 of X stages and a second section 62 of Y stages, the sum of X and Y being equal to Z. The "add" output of the first counter section 61 is fed to an OR circuit 63 and also, via a delay network 64 and an OR circuit 66, to the "add" input of the second counter stage 62. The "subtract" output of the first counter section 61 is also connected to the OR circuit 63, the output of which is connected to an input of the coincident detector 51, and also is connected, via a delay network 67 and an OR circuit 68, to the "subtract" input of the second counter section 62. The "add" and "subtract" outputs of the gate circuits 58 and 59 are applied, respectively, to remaining inputs of the OR circuits 66 and 68 at the input connections to the second counter section 62.

As has been described above, the prior art phase counter circuit of FIGURE 1 occasionally will count erroneously and erratically, due to the oscillator 19 losing its phase lock with respect to the incoming signal. This loss of phase lock may be caused, for example, due to a phase change of the incoming signal that is too rapid to be accommodated by the bandwidth limitations of the oscillator 19 and associated circuitry. The invention, as shown in FIGURE 3, compensates for and prevents this erroneous counting, by suitably applying corrective "add" and "subtract" pulses to the second counter section 62, via the "add" and "subtract" gates 58 and 59.

As mentioned above, the circuit combination of the phase detector 17 and 41, phase direction sensor 43, and analog-to-pulse converter 46, function to produce "add" or "subtract" pulses in response to any change in relative phase between the incoming signal and the locked oscillator 19. When the oscillator 19 and associated circuitry are properly locked in phase with the incoming signal from receiver 16, no output pulses occur from the converter 46, and the phase counter circuitry functions as has been described above with reference to FIGURE 1. However, when the oscillator 19 loses phase lock with the incoming signal, "add" or "subtract" pulses are generated by the converter 46, depending on whether the loss of phase lock is in the forward or reverse direction. These "add" and "subtract" pulses from the converter 46 are applied to the reversible counter 61–62 so as to counteract, and nullify, the erroneous pulses applied to the counter due to the out-of-lock oscillator 19.

These "add" and "subtract" pulses from the converter 46 could be applied directly to the reversible counter; however, the result would not be entirely accurate, because the desired cancellation effect would not occur properly whenever the corrective count pulses reach the counter simultaneously with pulses from the out-of-lock oscillator 19. The circuit elements 47 through 68, in accordance with the invention, prevent simultaneous application to the counter of pulses from the converters 27 and 46, in the following manner. The gate 52 is normally on, and the gate 53 is normally off. Thus, normally, any "add" or "subtract" pulse from the converter 46, when it occurs, will pass through the OR gate 47, the gate 52, and the OR circuit 57, to the inputs of both gates 58 and 59. Only one of these latter gates will be in the "on" condition, the gate 58 being on if an "add enable" signal is produced by the flip-flop 48 in response to the occurrence of an "add" signal output from converter 46, and the gate 59 being gated on by a "subtract enable" output from the flip-flop 48 in response to the occurrence of a subtract signal output from the converter 46. Thus, if an "add" pulse is applied to the gates 58 and 59 from the OR circuit 57, it will be gated through the gate 58 and will be applied via OR circuit 66 to the second counter section 62. Likewise, if the pulse applied to the gates 58 and 59 is a "subtract" pulse, it will be gated through the gate 59 and via the OR circuit 68, to the subtract input of the second counter section 62.

The preceding description assumed that the "add" and "subtract" pulses produced by the analog-to-pulse converter 46 did not occur simultaneously with "add" and "subtract" pulses produced by the other analog-to-pulse converter 27, whereby there would be problems with simultaneous application of "add" or "subtract" pulses to the reversible counter so as to cause erroneous compensation. Now assume that an "add" or "subtract" output occurs from the converter 27 approximately simultaneously with the occurrence of a corrective "add" or "subtract" output pulse from the converter 46. These simultaneous pulses are applied to the coincident detector 51, which produces an output enable signal in response thereto, which turns off the normally on gate 52 and turns on the normally off gate 53, whereby the pulse from the converter 46 is delayed by the delay network 54, and is applied via gate 53, OR circuit 57, and the proper gate 58 or 59 to the counter section 62. By thus delaying the corrective pulse by means of the delay network 54, it reaches the second counter section 62 at a different time from that of the erroneous pulse from the converter 27, so as to compensate for and nullify the erroneous count from converter 27. The time delay of the delay network 54 is approximately twice that of the time delay of delay network 64 and 67, to insure adequate time separation of the erroneous count pulses and the corrective count pulses applied to the counter. The delay networks 64 and 67 prevent erroneous compensation when corrective pulses occur slightly in advance of the erroneous pulses from counter 61.

The first counter section 61 must comprise a suitable number of counter stages in order to count to (divide by) the ratio N of the frequency divider 21. That is, the number of the X stages in the first counter section 61 is determined from the formula $$2^X = N$$

if the counter is of the usual binary counting arrangement, N being the aforesaid frequency multiplier factor of the oscillator 19.

The invention not only insures accurate counting in spite of any loss of oscillator phase-lock with the incoming signal, but also insures accurate counting during the process of oscillator phase re-locking.

While a preferred embodiment of the invention has been shown and described, other embodiments and modifications thereof will be apparent to persons skilled in the art, and will fall within the scope of invention as defined in the following claims.

We claim:

1. An electronic phase-shift counter circuit having a phase-locked oscillator circuit adapted to produce a signal locked in phase with an incoming signal, said incoming signal being subject to having phase shifts with respect to a reference signal, phase comparison means for comparing the phase of said phase-locked oscillator signal with that of said reference signal and generating signals in response to phase differences, and counting means connected to said phase comparison means for counting the cycles of phase shift of said oscillator signal with respect to said reference signal, said phase-locked oscillator being subject to loss of phase-lock with said incoming signal thereby causing said phase-shift counting to be erroneous, where in the improvement comprises a phase comparison circuit connected to compare the phase of said incoming signal with that of said oscillator signal and generate output signals indicative of any loss of phase lock between said incoming signal and said oscillator signal, means for generating corrective count pulses in response to said output signals, and means for applying said corrective pulses to said counting means to compensate for, and prevent erroneous counting due to, said loss of the oscillator phase-lock.

2. A circuit as claimed in claim 1, in which said reference signal is a radar transmitter carrier signal, and in which said incoming signal is derived from a reflected or transponded radar signal.

3. A circuit as claimed in claim 1, in which said phase-locked oscillator circuit is adapted to oscillate at a frequency N times that of said incoming signal, and including means to multiply the frequency of said reference signal by N for application to said phase comparison means.

4. A circuit as claimed in claim 1, in which said phase comparison circuit comprises first and second phase detectors each connected to receive as inputs thereto said incoming signal and said oscillator signal, a 90° phase shift network being interposed in the path of said oscillator signal to said second phase detector, a phase direction sensor connected to receive the output signals of said first and second phase detectors, a 180° phase shift network being interposed in the path of said signal from the second phase detector to said phase direction sensor, and an analog-to-pulse converter circuit connected to signal outputs of said phase direction sensor thereby to produce "add" or "subtract" corrective count pulses whenever said oscillator circuit loses phase-lock with said incoming signal.

5. A circuit as claimed in claim 4, including first and second normally disabled gate circuits, means to apply said corrective count pulses to the inputs of said first and second gate circuits, means to enable said first gate circuit whenever said add corrective count pulses occur, means to enable said second gate circuit whenever said subtract corrective count pulses occur, means of connecting the output of said first gate circuit to an add input of said counting means, and means connecting the output of said second gate circuit to a subtract input of said counting means.

6. A circuit as claimed in claim 5, including a third gate circuit, normally enabled, interposed in the path of said corrective pulses between said analog-to-pulse converter and said first and second gate circuits, a fourth gate circuit, normally disabled, and a delay network connected in series and interposed in the path of said corrective pulses in parallel with said third gate circuit, a coincident detector connected to receive as inputs thereto said corrective pulses and count pulses from said counting means, said coincident detector being adapted to generate coincidence signals in response to coincident occurrences of said input pulses thereto, and means connecting said coincidence signals to said third and fourth gate circuits to render said third gate circuit disabled and said fourth gate circuit enabled in response thereto.

7. A circuit as claimed in claim 6, in which said phase-locked oscillator circuit is adapted to oscillate at a frequency N times that of said incoming signal, and in which said counting means comprises two sections of binary counter stages coupled together, the first of said sections comprising X binary counter stages for counting to N as determined by the formula $$2^X = N$$

said count pulses to the input of said coincident detector being derived from the output of said first section of the counting means, and the outputs of said first and second gate circuits being connected to inputs of said second section of the counting means.

8. A circuit as claimed in claim 7, including delay means interconnecting said first and second sections of the counting means and having a time delay of approximately one-half that of said delay network of claim 6.

References Cited

UNITED STATES PATENTS 3,217,258 11/1965 Arlin et al. ---------- 325—419

RODNEY D. BENNETT, Jr., *Primary Examiner.*

CHARLES L. WHITHAM, *Assistant Examiner.*

U.S. Cl. X.R.

325—419